(12) United States Patent
Kang

(10) Patent No.: US 9,384,898 B2
(45) Date of Patent: Jul. 5, 2016

(54) MULTILAYER CERAMIC CAPACITOR AND METHOD OF MANUFACTURING THE SAME

(71) Applicant: SAMSUNG ELECTRO-MECHANICS CO., LTD., Suwon, Gyunggi-do (KR)

(72) Inventor: Sung Hyung Kang, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 179 days.

(21) Appl. No.: 13/974,795

(22) Filed: Aug. 23, 2013

(65) Prior Publication Data

US 2014/0085767 A1 Mar. 27, 2014

(30) Foreign Application Priority Data

Sep. 26, 2012 (KR) ........................ 10-2012-0107393

(51) Int. Cl.
  *H01G 4/30* (2006.01)
  *H01G 13/00* (2013.01)
  *H01G 4/12* (2006.01)
  *H01G 4/232* (2006.01)
(52) U.S. Cl.
  CPC . *H01G 4/30* (2013.01); *H01G 4/12* (2013.01); *H01G 4/232* (2013.01); *H01G 13/00* (2013.01); *Y10T 156/1052* (2015.01)
(58) Field of Classification Search
  None
  See application file for complete search history.

(56) References Cited

U.S. PATENT DOCUMENTS

| 4,658,328 | A * | 4/1987 | Sakabe | ............... H01G 4/302 361/309 |
| 6,278,065 | B1 * | 8/2001 | Hopper | ............... H01G 4/224 174/139 |
| 7,292,429 | B2 * | 11/2007 | Randall | ..................... 361/303 |
| 9,064,623 | B2 * | 6/2015 | Shirakawa | ............ H01C 1/148 |
| 2004/0064940 | A1 * | 4/2004 | Furukawa | ...................... 29/831 |
| 2006/0139848 | A1 | 6/2006 | Kim et al. | |
| 2013/0020913 | A1 * | 1/2013 | Shirakawa | ..................... 310/364 |
| 2013/0057112 | A1 * | 3/2013 | Shirakawa | ............ H01C 1/148 310/311 |

FOREIGN PATENT DOCUMENTS

JP 2011-003846 A 1/2011
KR 10-0587006 B1 5/2006

* cited by examiner

*Primary Examiner* — Dion R Ferguson
(74) *Attorney, Agent, or Firm* — McDermott Will & Emery LLP

(57) ABSTRACT

There is provided a multilayer ceramic capacitor including a ceramic body having first and second side surfaces opposing each other and third and fourth end surfaces connecting the first and second side surfaces, first and second internal electrodes formed in the ceramic body and having one ends exposed to the first and second side surfaces and the third end surface or exposed to the first and second side surfaces and the fourth end surface, first and second external electrodes formed on an outer side of the ceramic body and electrically connected to the first and second internal electrodes, and a plating layer partially formed on certain regions of the first and second external electrodes, wherein a polymer layer is additionally formed on the ceramic body on regions of upper portions of the first and second external electrodes on which the plating layer is not formed.

3 Claims, 3 Drawing Sheets

B-B'

A - A'

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2012-0107393 filed on Sep. 26, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a high capacitance multilayer ceramic capacitor having excellent reliability, and a method of manufacturing the same.

2. Description of the Related Art

In general, electronic components using a ceramic material, such as a capacitor, an inductor, a piezoelectric element, a varistor, a thermistor, or the like, include a ceramic body formed of a ceramic material, internal electrodes formed in the ceramic body, and external electrodes mounted on a surface of the ceramic body so as to be connected to the internal electrodes.

Among ceramic electronic components, a multilayer ceramic capacitor includes a plurality of stacked dielectric layers, internal electrodes disposed to face each other, having the dielectric layer interposed therebetween, and external electrodes electrically connected to the internal electrodes.

The multilayer ceramic capacitor has been widely used as a component for a computer, a mobile communications device such as a personal digital assistance (PDA), a mobile phone, or the like, due to advantages such as a small size, high capacitance, ease of mounting, or the like.

Recently, as electronic products have been miniaturized and multi-functionalized, chip components have also tended to be miniaturized and highly functionalized. Therefore, a multilayer ceramic capacitor having a small size and high capacitance has been demanded.

In order to increase capacitance of multilayer ceramic capacitors, a method of thinning a dielectric layer, a method of highly stacking thinned dielectric layers, a method of improving coverage of an internal electrode, and the like have been considered. Further, a method of increasing an area of an overlapped portion between the internal electrodes forming capacitance has been considered.

Generally, a multilayer ceramic capacitor may be manufactured as follows. First, a ceramic green sheet is manufactured, and a conductive paste is printed on the ceramic green sheet, thereby forming an internal electrode. Several tens to several hundreds of ceramic green sheets including the internal electrode formed thereon are stacked, thereby forming a green ceramic multilayer body. Thereafter, the green ceramic multilayer body is compressed at a high temperature and high pressure to form a hard green ceramic multilayer body, followed by performing a cutting process, thereby manufacturing a green chip. Next, the green chip is plasticized and fired, and then an external electrode is formed, thereby completing a multilayer ceramic capacitor.

When the multilayer ceramic capacitor is formed by the above-mentioned manufacturing method, it is difficult to significantly reduce an area of a margin part of the dielectric layer on which the internal electrodes are not formed, and thus, there is a limitation in increasing the area of the overlapped portion between the internal electrodes. Further, a margin portion of a corner portion of the multilayer ceramic capacitor is formed to be thicker than a margin portion of the other region thereof, such that it is not easy to remove carbon at the time of the plasticizing and firing.

RELATED ART DOCUMENT

Japanese Patent Laid-open Publication No. 2011-003846

SUMMARY OF THE INVENTION

An aspect of the present invention provides a high-capacitance multilayer ceramic capacitor having excellent reliability and a method of manufacturing the same.

According to an aspect of the present invention, there is provided a multilayer ceramic capacitor including: a ceramic body having first and second side surfaces opposing each other and third and fourth end surfaces connecting the first and second side surfaces to each other; first and second internal electrodes formed in the ceramic body and having one ends exposed to the first and second side surfaces and the third end surface or exposed to the first and second side surfaces and the fourth end surface; first and second external electrodes formed on an outer side of the ceramic body and electrically connected to the first and second internal electrodes; and a plating layer partially formed on certain regions of the first and second external electrodes, wherein a polymer layer is additionally formed on the ceramic body and on regions of upper portions of the first and second external electrodes on which the plating layer is not formed.

The first and second internal electrodes may only be exposed to certain regions of the first and second side surfaces of the ceramic body.

The first and second internal electrodes may not be exposed to regions on which the plating layer is formed in the first and second side surfaces of the ceramic body.

According to an aspect of the present invention, there is provided a method of manufacturing a multilayer ceramic capacitor, the method including: preparing a first ceramic green sheet on which a plurality of stripe-type first internal electrode patterns are formed, spaced apart from one another by a predetermined interval, and a second ceramic green sheet on which a plurality of stripe-type second internal electrode patterns are formed, spaced apart from one another by a predetermined interval; stacking the first and second ceramic green sheets so that the stripe-type first internal electrode pattern and the stripe-type second internal electrode pattern are alternated with each other to form a ceramic green sheet multilayer body, the multilayer body including a cover layer formed by stacking a plurality of ceramic green sheets on at least one of upper and lower surfaces thereof; cutting the ceramic green sheet multilayer body in a stacking direction thereof to across the stripe-type first internal electrode pattern and the stripe-type second internal electrode pattern so that first and second internal electrodes have a predetermined width and the multilayer body has side surfaces to which distal ends of the first and second internal electrodes in a width direction are exposed; applying a conductive paste to an outer side of the multilayer body to form first and second external electrodes; and coating a polymer material on the multilayer body and certain regions of upper portions of the first and second external electrodes.

The method may further include, after the coating of the polymer material, forming a plating layer on a remaining region on which the polymer material is not coated in the upper portions of the first and second external electrodes.

The first and second internal electrodes may not be exposed to the region on which the plating layer is formed in a width direction of the multilayer body.

The first and second internal electrodes may only be exposed to certain regions in a width direction of the multilayer body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
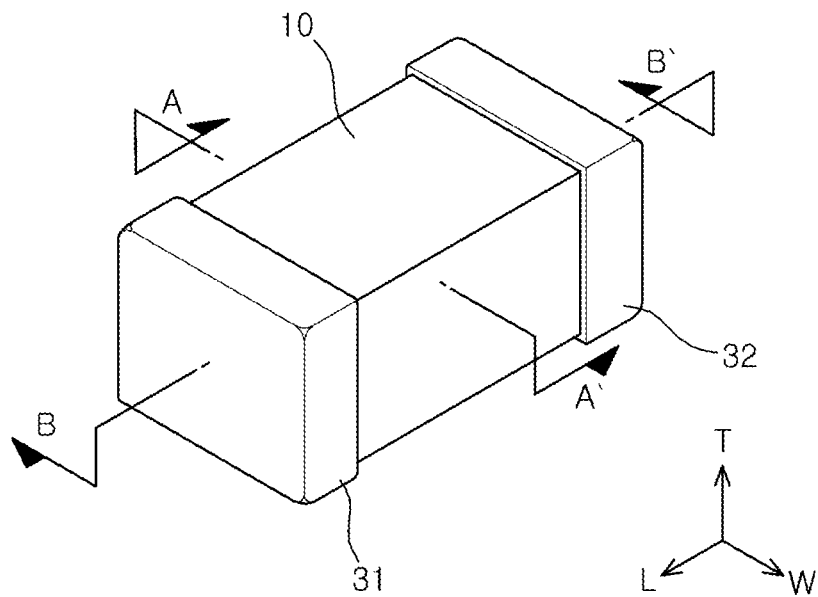
FIG. 1 is a schematic perspective view showing a multilayer ceramic capacitor according to an embodiment of the present invention.

FIG. 1 is a schematic perspective view showing a multilayer ceramic capacitor according to an embodiment of the present invention.

Figure 2:
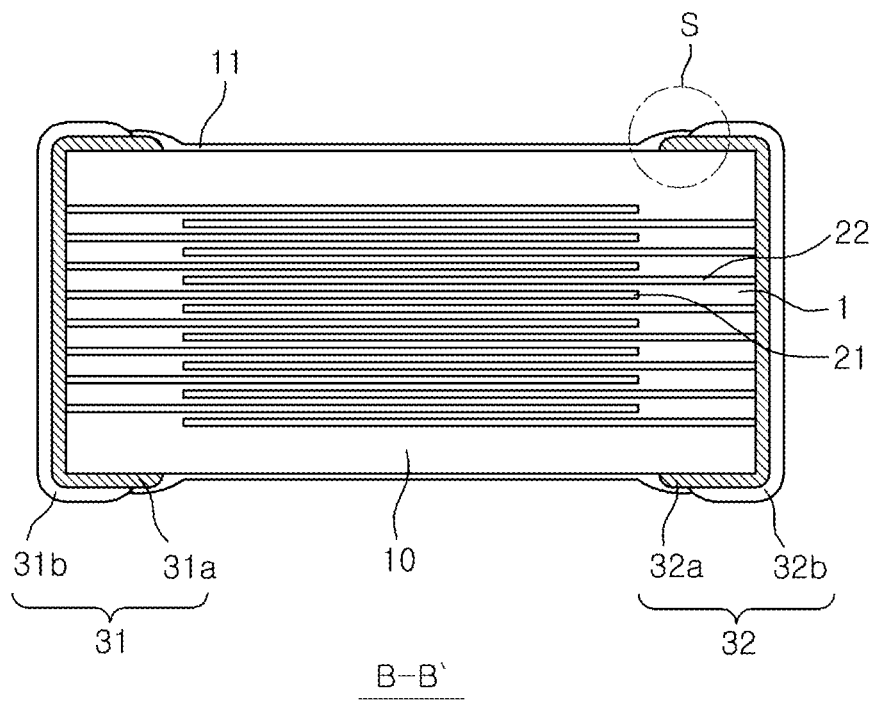
FIG. 2 is a cross-sectional view taken along line B-B' of FIG. 1.

FIG. 2 is a cross-sectional view taken along line B-B' of FIG. 1.

Figure 3:
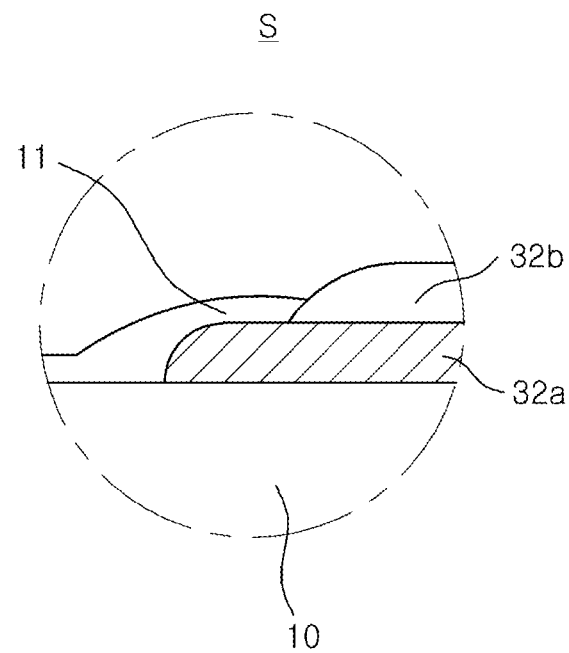
FIG. 3 is an enlarged view of part S of FIG. 2.

FIG. 3 is an enlarged view of part S of FIG. 2.

Figure 4:
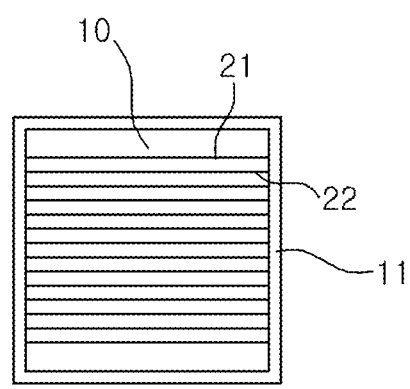
FIG. 4 is a cross-sectional view taken along line A-A' of FIG. 1.

FIG. 4 is a cross-sectional view taken along line A-A' of FIG. 1.

Figure 5:
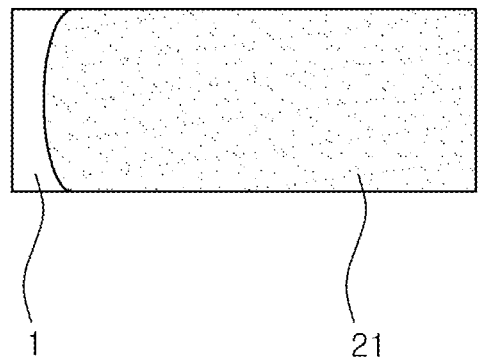
FIG. 5 is a schematic plan view showing an internal electrode of the multilayer ceramic capacitor according to the embodiment of the present invention.

FIG. 5 is a schematic plan view showing an internal electrode of the multilayer ceramic capacitor according to the embodiment of the present invention.

Referring to FIGS. 1 through 5, the multilayer ceramic capacitor according to the embodiment of the present invention may include a ceramic body 10; first and second internal electrodes 21 and 22 formed in the ceramic body; first and second external electrodes 31a and 32a formed on an outer side of the ceramic body 10 and electrically connected to the first and second internal electrodes 21 and 22; and plating layers 31b and 32b formed on certain regions of the first and second external electrodes 31a and 32a.

The ceramic body 10 may have first and second side surfaces opposing each other and third and fourth end surfaces connecting the first and second side surfaces to each other.

A shape of the ceramic body 10 is not particularly limited, but may be a rectangular parallelepiped shape as shown in the drawing.

The first and second internal electrodes 21 and 22 formed in the ceramic body 10 may have one ends exposed to the first side surface, the second side surface, and the third end surface or may be exposed to the first side surface, the second side surface, and the fourth end surface.

The first and second internal electrodes 21 and 22 may be formed as a pair of first and second internal electrodes 21 and 22 having different polarities.

One end of the first internal electrode 21 may be exposed to the first side surface, the second side surface, and the third end surface, and one end of the second internal electrode 22 may be exposed to the first side surface, the second side surface, and the fourth end surface.

The other ends of the first and second internal electrodes 21 and 22 may be spaced apart from the third or fourth end surface by a predetermined interval.

The first and second external electrodes 31a and 31b may be formed on the third and fourth end surfaces of the ceramic body to thereby be electrically connected to the internal electrodes.

The plurality of dielectric layers 1 configuring the ceramic body 10 may be in a sintered state and be integrated with each other so as not to confirm a boundary between dielectric layers adjacent to each other.

The first and second internal electrodes 21 and 22 may be formed on the dielectric layer and may be formed in the ceramic body by sintering, having the dielectric layer interposed therebetween.

The dielectric layer 1 may have the same width as that of the first internal electrode 21.

That is, the first internal electrode 21 may be formed so as to be exposed in a width direction of the dielectric layer 112.

The width of the dielectric layer and the width of the internal electrode may be based on the first and second side surfaces of the ceramic body.

Although not particularly limited, according to the embodiment of the present invention, the width of the dielectric layer and the width of the internal electrode may be 100 to 900 µm. In more detail, the width of the dielectric layer and the width of the internal electrode may be 100 to 500 µm or 100 to 900 µm.

The first and second internal electrodes 21 and 22 may be formed using a conductive paste formed of at least one of, for example, a noble metal material such as palladium (Pd), a palladium-silver (Pd—Ag) alloy, or the like, nickel (Ni), and copper (Cu), but is not limited thereto.

The first and second external electrodes 31 and 32 may be formed of the same conductive material as that of the internal electrode but is not limited thereto. For example, the first and second external electrodes 31 and 32 may be formed of copper (Cu), silver (Ag), nickel (Ni), or the like.

The first and second external electrodes 31 and 32 may be formed by applying a conductive paste prepared by adding glass frits to the metal powder and then firing the applied conductive paste.

The plating layers 31b and 32b may be partially formed on certain regions of the first and second external electrodes 31a and 32a.

The plating layers 31b and 32b are not particularly limited, but may be formed of, for example, nickel (Ni), tin (Sn), or the like.

The first and second internal electrodes 21 and 22 may be partially exposed to certain regions of the first and second side surfaces of the ceramic body 10.

In addition, the first and second internal electrodes 21 and 22 may not be exposed to regions on which the plating layers 31b and 32b are formed on the first and second side surfaces of the ceramic body 10.

In the case in which the first and second internal electrodes 21 and 22 are exposed to the regions of the first and second side surfaces on which the plating layers 31b and 32b are formed, a plating solution may infiltrate into the internal electrode, such that reliability may be deteriorated.

According to the embodiment of the present invention, one end of the first internal electrode 21 is exposed to the first side surface, the second side surface, and the third end surface, and one end of the second internal electrode 22 is exposed to the first side surface, the second side surface, and the fourth end surface, such that an area of an overlapped portion between the internal electrodes formed in the ceramic body 10 may be increased.

Therefore, the area of the overlapped portion between the internal electrodes is increased, such that high capacitance of the multilayer ceramic capacitor may be secured.

Generally, as the dielectric layers are highly stacked, thicknesses of the dielectric layer and the internal electrode become relatively thin.

Therefore, the phenomenon that the internal electrodes are short-circuited may frequently occur.

In addition, when the internal electrodes are only formed on a portion of the dielectric layer, an accelerated lifespan or reliability of insulating resistance may be deteriorated due to a step formed by the internal electrodes.

However, according to the embodiment of the present invention, even when the internal electrode and the dielectric layer are thinly formed, since one end of the first internal electrode 21 is exposed to the first side surface, the second side surface, and the third end surface, and one end of the second internal electrode 22 is exposed to the first side surface, the second side surface, and the fourth end surface, the area of the overlapped portion between the internal electrodes may be increased, thereby increasing capacitance of the multilayer ceramic capacitor.

In addition, the step formed through the internal electrodes may be decreased, such that an accelerated lifespan of insulating resistance may be improved, thereby providing the multilayer ceramic capacitor having excellent capacitance characteristics and reliability.

Meanwhile, as described above, in the case in which one end of the first internal electrode 21 is exposed to the first side surface, the second side surface, and the third end surface, and one end of the second internal electrode 22 is exposed to the first side surface, the second side surface, and the fourth end surface, reliability of the multilayer ceramic capacitor may be deteriorated.

Therefore, according to the embodiment of the present invention, a polymer layer 11 may be additionally formed on the ceramic body and a region of upper portions of the first and second external electrodes on which the plating layer is not formed.

The polymer layer 11 is applied while enclosing the entire surface of the ceramic body 10, such that a problem in that the first and second internal electrodes 21 and 22 are exposed to regions of the first and second side surfaces to be vulnerable to the outside may be prevented.

A material of the polymer layer 11 is not particularly limited, but may be a general polymer material. For example, the material of the polymer layer 11 may be an epoxy resin.

According to the embodiment of the present invention, the polymer layer 11 may be formed only on the region on which the plating layer is not formed in the upper regions of the first and second external electrodes.

The feature as described above may be implemented by a method of manufacturing a multilayer ceramic capacitor according to another embodiment of the present invention to be described below. Since the polymer layer is formed before the plating layer is formed after the first and second external electrodes are formed, this feature may be implemented.

According to the embodiment of the present invention, the polymer layer is formed on the ceramic body and the region on which the plating layer is not formed in the upper regions of the first and second external electrodes, such that the area of the overlapped portion between the internal electrodes may be relatively increased to thereby secure high capacitance of the multilayer ceramic capacitor, and at the same time, the step by the internal electrodes may be decreased to thereby implement the multilayer ceramic capacitor having excellent reliability.

Figure 6:
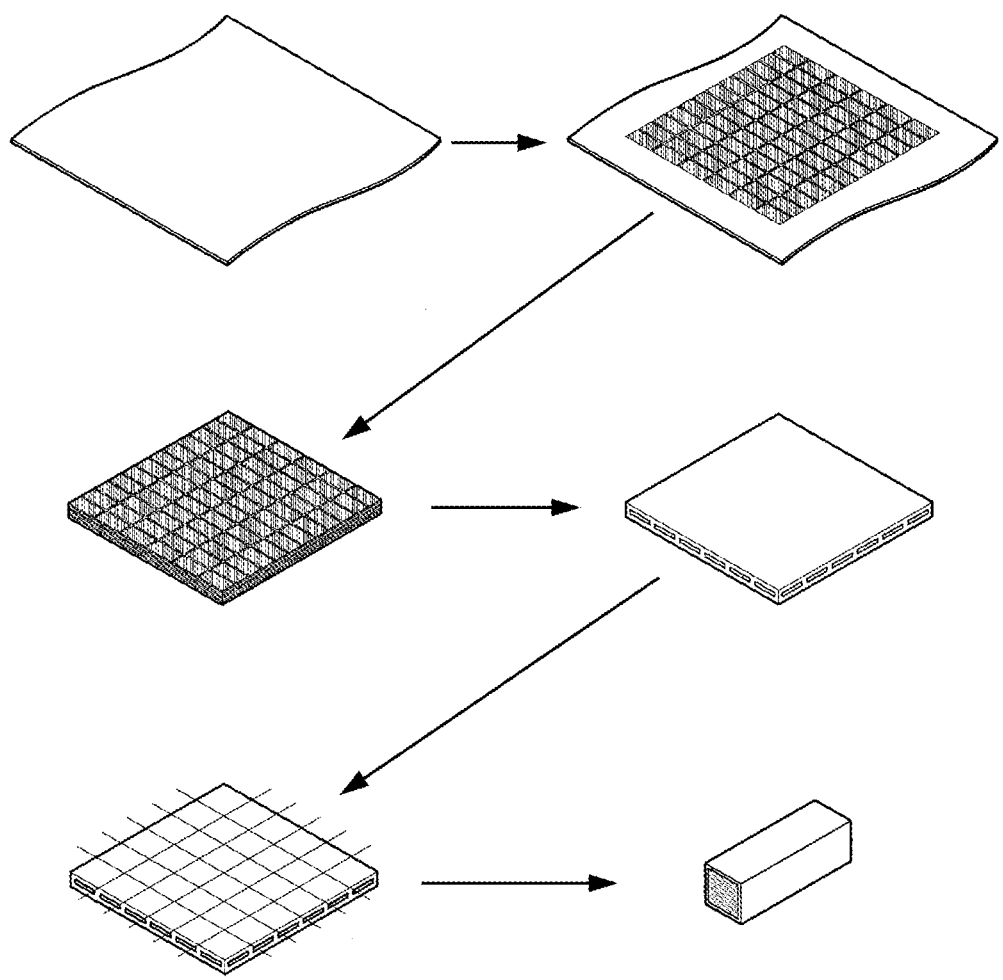
FIG. 6 is a schematic process view showing a method of manufacturing a multilayer ceramic capacitor according to another embodiment of the present invention.

FIG. 6 is a schematic process view showing a method of manufacturing a multilayer ceramic capacitor according to another embodiment of the present invention.

Referring to FIG. 6, the method of manufacturing a multilayer ceramic capacitor according to another embodiment of the present invention may include: preparing a first ceramic green sheet on which a plurality of stripe-type first internal electrode patterns are formed, spaced apart from one another by a predetermined interval, and a second ceramic green sheet on which a plurality of stripe-type second internal electrode patterns are formed, spaced apart from one another by a predetermined interval; stacking the first and second ceramic green sheets on one another so that the stripe-type first internal electrode pattern and the stripe-type second internal electrode pattern are alternated with each other, to form a ceramic green sheet multilayer body, the multilayer body including a cover layer formed by stacking a plurality of ceramic green sheets on at least one of upper and lower surfaces thereof; cutting the ceramic green sheet multilayer body in a stacking direction thereof to across the stripe-type first internal electrode pattern and the stripe-type second internal electrode pattern so that first and second internal electrodes have a predetermined width and the multilayer body has side surfaces to which distal ends of the first and second internal electrodes in a width direction are exposed; applying a conductive paste onto an outer side of the multilayer body to form first and second external electrodes thereon; and coating a polymer material on the multilayer body and certain regions of upper portions of the first and second external electrodes.

The ceramic green sheet may be formed of a ceramic paste containing ceramic powder, an organic solvent, and an organic binder.

The ceramic powder may be a material having high permittivity, and for example, a barium titanate ($BaTiO_3$)-based material, a lead complex perovskite-based material, strontium titanate ($SrTiO_3$)-based material, or the like, may be used, but the present invention is not limited thereto. Specifically, barium titanate ($BaTiO_3$) powder may be used.

The ceramic green sheet is fired to become a dielectric layer 1 configuring a ceramic body.

The stripe-type first internal electrode pattern may be formed of an internal electrode paste containing a conductive metal.

The conductive metal may be Ni, Cu, Pd, or an alloy thereof but is not limited thereto.

A method of forming the stripe-type first internal electrode pattern on the ceramic green sheet is not particularly limited. For example, a printing method such as a screen printing method or a gravure printing method may be used.

Further, the plurality of stripe-type second internal electrode patterns may be formed on another ceramic green sheet 212a, spaced apart from one another by a predetermined interval.

Next, the ceramic green sheet may be alternately stacked so that the stripe-type first internal electrode pattern and the stripe-type second internal electrode pattern are alternately stacked.

Thereafter, the stripe-type first internal electrode pattern may form the first internal electrode 21, and the stripe-type second internal electrode pattern may form the second internal electrode 22.

The ceramic green sheet on which the plurality of parallel stripe-type first internal electrode patterns are printed and the ceramic green sheet on which the plurality of parallel stripe-type second internal electrode patterns are printed may be alternately stacked.

Then, the multilayer body formed by stacking the ceramic green sheets on one another may be cut in a stacking direction thereof so as to across the plurality of stripe-type first internal electrode patterns and stripe-type second internal electrode patterns.

In more detail, the stripe-type first internal electrode pattern and the stripe-type second internal electrode pattern may be cut in a length direction to thereby be divided into a plurality of internal electrodes having a predetermined width.

In this case, the stacked ceramic green sheet may also be cut together with the internal electrode patterns.

As a result, the dielectric layer may be formed to have the same width as that of the internal electrode.

The distal ends of the first and second internal electrodes may be exposed to cutting surfaces of the bar-type multilayer body.

The cutting surfaces of the bar-type multilayer body may be referred to as the first and second side surfaces of the bar-type multilayer body, respectively.

After the ceramic green sheet multilayer body is fired, the fired ceramic green sheet multilayer body may be cut into the bar-type multilayer bodies. In addition, after the ceramic green sheet is cut into bar-type multilayer bodies, the firing may be performed. Although not particularly limited, the firing may be performed at 1100 to 1300° C. under $N_2$—$H_2$ atmosphere.

Next, the first and second external electrodes may be formed by applying the conductive paste to the outer side of the multilayer body.

The first and second external electrodes may be formed by a general method. For example, the first and second external electrodes may be formed by a dipping method, but the present invention is not limited thereto.

Then, a polymer material may be coated on the multilayer body and certain regions of the upper portions of the first and second external electrodes.

A process of coating the polymer material is not particularly limited, but the polymer material may be coated by a general process.

According to another embodiment of the present invention, the method of manufacturing a multilayer ceramic capacitor may further include forming a plating layer on the remaining region on which the polymer material is not coated in the upper portions of the first and second external electrodes after the coating of the polymer material.

Therefore, according to the embodiment of the present invention, the internal electrodes may be overlapped with each other up to a margin part of the ceramic body in the width direction, such that excellent capacitance may be implemented, and reliability may be improved, thereby implementing high reliability and high capacitance multilayer ceramic capacitor.

As set forth above, in the multilayer ceramic capacitor according to embodiments of the present invention, the internal electrodes may be overlapped with each other up to the margin part of the ceramic body in the width direction, such that the excellent capacitance may be implemented, and the reliability may be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body having first and second side surfaces opposing each other and third and fourth end surfaces connecting the first and second side surfaces to each other;
   a first internal electrode formed in the ceramic body and exposed to the first and second side surfaces and the third end surface;
   a second internal electrode formed in the ceramic body and exposed to the first and second side surfaces and the fourth end surface;
   first and second external electrodes formed on an outer side of the ceramic body and electrically connected to the first and second internal electrodes;
   a plating layer formed on a partial region of the first and second external electrodes; and
   a polymer layer formed to enclose the ceramic body and the first and second external electrodes except the partial region on which the plating layer is formed.

2. The multilayer ceramic capacitor of claim 1, wherein the first and second internal electrodes are only exposed to certain regions of the first and second side surfaces of the ceramic body.

3. The multilayer ceramic capacitor of claim 1, wherein the first and second internal electrodes are not exposed to regions on which the plating layer is formed in the first and second side surfaces of the ceramic body.

* * * * *